United States Patent
McLain et al.

(10) Patent No.: US 7,243,019 B2
(45) Date of Patent: Jul. 10, 2007

(54) EGR FUZZY LOGIC PINTLE POSITIONING SYSTEM

(75) Inventors: Kurt D. McLain, Clarkston, MI (US); Wenbo Wang, Novi, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 28 days.

(21) Appl. No.: 11/296,175

(22) Filed: Dec. 7, 2005

(65) Prior Publication Data
US 2007/0129877 A1    Jun. 7, 2007

(51) Int. Cl.
*F02M 25/07* (2006.01)
*F02B 47/08* (2006.01)
*G06F 19/00* (2006.01)

(52) U.S. Cl. .................. 701/108; 123/568.21
(58) Field of Classification Search .......... 123/568.11, 123/568.12, 568.16, 568.21; 701/103, 206, 701/108; 73/116, 117.3, 118.1; 251/129.15, 251/129.16
See application file for complete search history.

(56) References Cited

U.S. PATENT DOCUMENTS

| | | | |
|---|---|---|---|
| 5,722,236 A | * | 3/1998 | Cullen et al. ............... 60/274 |
| 6,047,690 A | * | 4/2000 | Field et al. ............... 123/568.2 |
| 6,116,083 A | * | 9/2000 | Cullen et al. ............... 73/118.1 |
| 6,755,078 B2 | * | 6/2004 | Hernandez et al. ......... 73/118.1 |
| 2005/0021218 A1 | * | 1/2005 | Bhargava et al. ........... 701/108 |

* cited by examiner

*Primary Examiner*—Willis R. Wolfe, Jr.
(74) *Attorney, Agent, or Firm*—Christopher DeVries

(57) ABSTRACT

An exhaust gas recirculation (EGR) valve positioning system that positions an EGR valve pintle includes a predicted temperature fuzzy logic module, an under heat fuzzy logic module, an over heat fuzzy logic module, and a multiplication module. The predicted temperature fuzzy logic module determines a predicted temperature of the pintle and generates a predicted temperature modifier based thereon. The under heat fuzzy logic module generates an under heat modifier representing the temperature of the pintle during warmup of an engine. The over heat fuzzy logic module generates an over heat modifier representing the temperature of the pintle after warmup of the engine. The multiplication module communicates with the predicted temperature fuzzy logic module, the under heat fuzzy logic module, and the over heat fuzzy logic module and generates a modifier signal based on the product of the predicted temperature modifier, the under heat modifier, and the over heat modifier.

16 Claims, 3 Drawing Sheets

EGR FUZZY LOGIC PINTLE POSITIONING SYSTEM

FIELD OF THE INVENTION

The present invention relates to exhaust gas recirculation (EGR) systems for internal combustion engines, and more particularly to an EGR valve positioning system that predicts operating characteristics of the EGR valve based on a predicted temperature of a pintle.

BACKGROUND OF THE INVENTION

Internal combustion engines combust an air and fuel mixture within cylinders to reciprocally drive pistons within the cylinders. The pistons rotatably drive a crankshaft to provide drive torque to a powertrain. Exhaust generated by the combustion process is exhausted from the engine through an exhaust manifold and treated by an exhaust system.

Engine systems often include an exhaust gas recirculation (EGR) system to reduce engine emissions. EGR systems re-circulate exhaust gas back into the cylinders, which tends to limit the amount of oxygen available for combustion. Limiting the oxygen available for combustion lowers combustion temperatures and reduces engine emissions. EGR can also improve fuel economy and/or performance when spark timing and fuel injection are optimized along with the operation of the EGR system. Debris build-up within the EGR system restricts the flow of exhaust and minimizes the effectiveness of the EGR system. Thus, an EGR diagnostic test is performed to determine when EGR flow is restricted.

The EGR diagnostic test compares a maximum manifold absolute pressure (MAP) when the EGR valve is open to a maximum MAP when the EGR valve is closed. The diagnostic test uses the maximum MAP difference as an indication of EGR flow. This method requires positioning a pintle within the EGR valve in open and closed positions.

During operation of the engine, operating characteristics of the EGR valve are affected by temperature changes to the pintle. Each time the EGR diagnostic test is performed, the EGR valve must locate a new target position. The new target position is determined by starting from a low point and working towards a position that allows a desired flow through the EGR valve. Attempting to locate the new target position can create excessive variations in EGR flow data and increased exhaust emissions. Furthermore, the current positioning method is difficult to calibrate due to the differing EGR valve characteristics during operation of the engine.

SUMMARY OF THE INVENTION

An exhaust gas recirculation (EGR) valve positioning system for an engine system that positions a pintle within an EGR valve based on a temperature of the pintle according to the present invention includes a predicted temperature fuzzy logic module, an under heat fuzzy logic module, an over heat fuzzy logic module, and a multiplication module. The predicted temperature fuzzy logic module determines a predicted temperature of the pintle and generates a predicted temperature modifier based on the predicted temperature. The under heat fuzzy logic module generates an under heat modifier representing the temperature of the pintle during warmup of the engine system. The over heat fuzzy logic module generates an over heat modifier representing the temperature of the pintle after warmup of the engine system.

The multiplication module communicates with the predicted temperature fuzzy logic module, the under heat fuzzy logic module, and the over heat fuzzy logic module and generates a modifier signal based on the product of the predicted temperature modifier, the under heat modifier, and the over heat modifier.

In other features, the EGR valve positioning system includes an error fuzzy logic module, a summation module, and a limiting function module. The fuzzy logic module generates a first position signal based on a measured position of the pintle. The summation module communicates with the multiplication module and the fuzzy logic module and generates a second position signal based on the summation of the modifier signal and the first position signal. The limiting function module communicates with the summation module and scales the second position signal between an upper and lower level creating command signal to control the pintle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
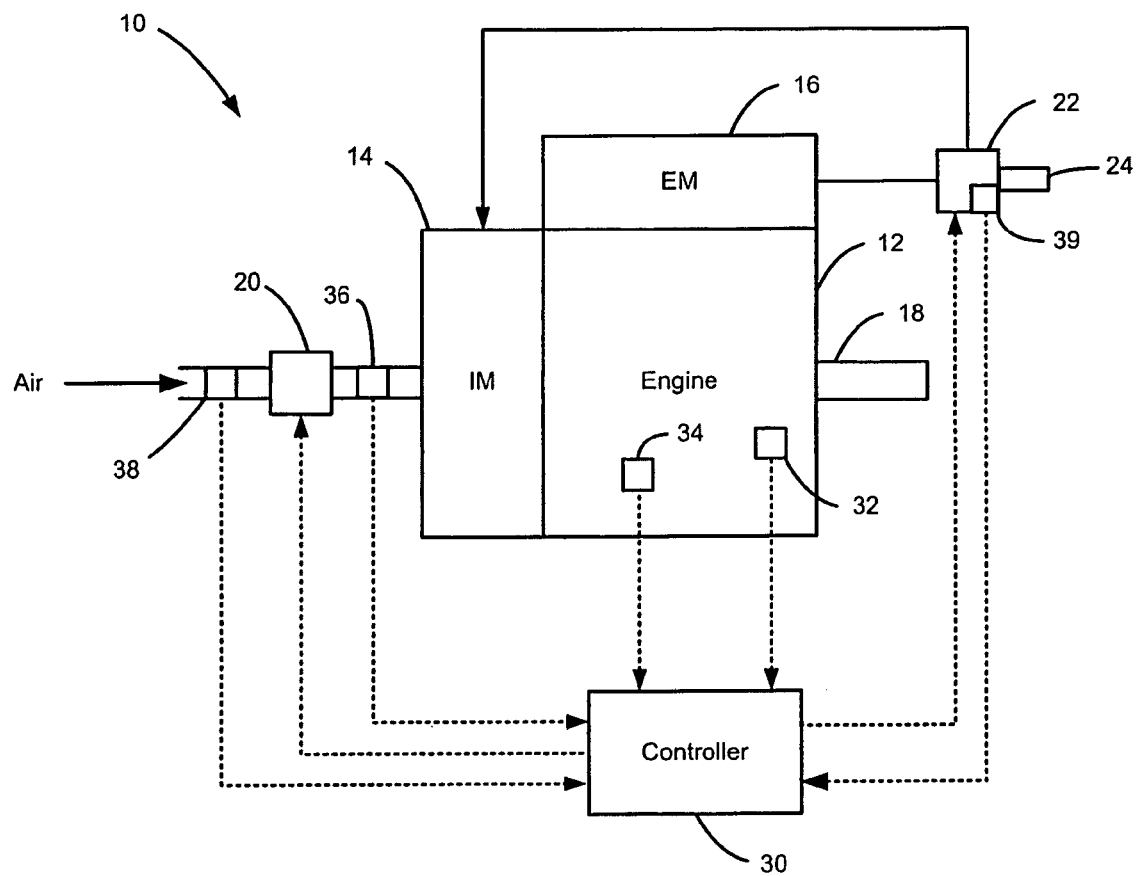
FIG. 1 is a functional block diagram of an exemplary engine system including an EGR valve.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is illustrated. The engine system 10 includes an engine 12, an intake manifold 14 and an exhaust manifold 16. The engine 12 combusts an air and fuel mixture within cylinders (not shown) to drive pistons (not shown) that rotatably drive a crankshaft 18. Air is drawn through a throttle 20 and into the intake manifold 14, which distributes air to the cylinders. Exhaust from the combustion process is exhausted from the cylinders and into the exhaust manifold 16. The exhaust is treated in an exhaust system (not shown).

The engine system 10 further includes an exhaust gas recirculation (EGR) valve 22. The EGR valve 22 includes a pintle 24 that is selectively actuated to re-direct a portion of the exhaust gas back into the intake manifold 14. The EGR valve 22 operates in EGR ON and EGR OFF modes. In the EGR OFF mode, the EGR valve 22 positions the pintle 24 to a closed position and no exhaust gas is circulated back into the intake manifold 14. In the EGR ON mode, the EGR valve 22 positions the pintle 24 to an open position and a portion of the exhaust gas is circulated back into the intake manifold 14.

A controller 30 regulates engine operation and provides EGR flow restriction control including the positioning of the EGR valve 22. An engine speed sensor 32 is responsive to engine speed (RPM) and generates an RPM signal based thereon. An engine coolant temperature sensor 34 is responsive to the temperature of coolant within the engine and generates a coolant temperature signal based thereon. Similarly, an air intake temperature sensor 36 is responsive to the temperature of air passing into the intake manifold 14 and generates an air intake temperature signal based thereon. An air flow sensor 38 is responsive to air flow into the intake manifold 14 and generates an air flow signal based thereon. A position sensor 39 is responsive to the position of the pintle 24 and generates a measured position signal based thereon. The controller 30 receives the RPM signal, the coolant temperature signal, the air intake temperature signal, the air flow signal and the measured position signal, and positions the pintle 24 of the EGR valve 22 based thereon.

Figure 2:
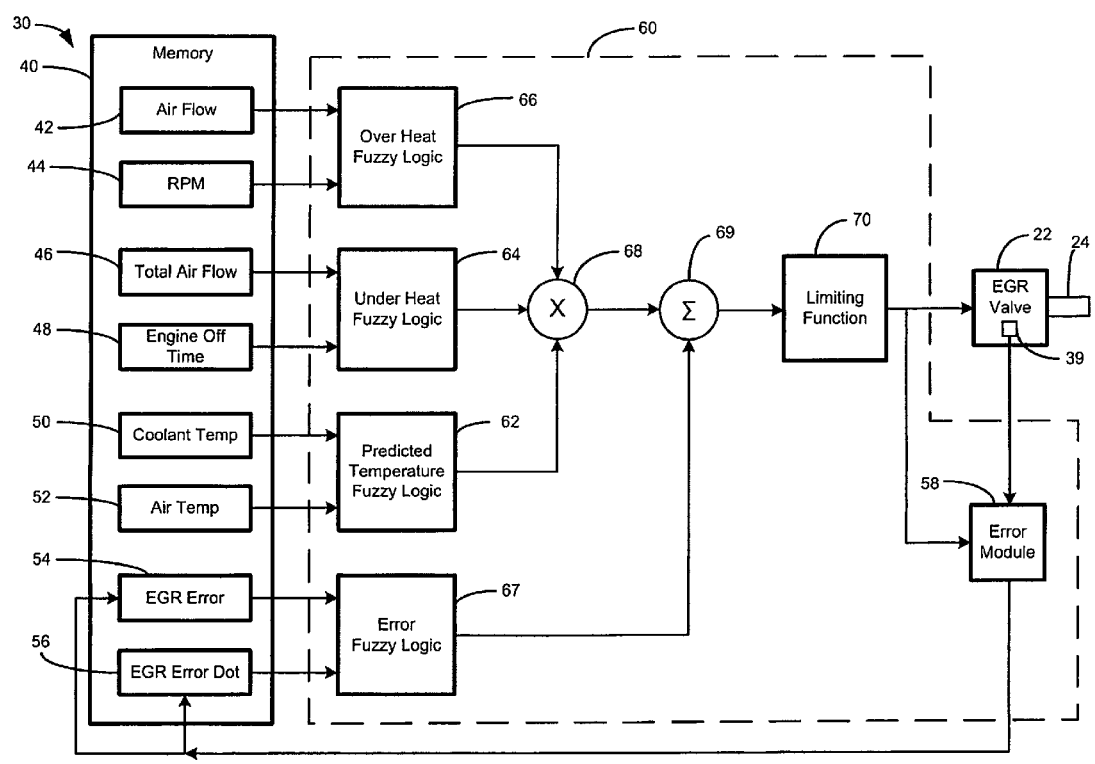
FIG. 2 is a schematic of a fuzzy logic pintle positioning system according to the present invention.

Referring now to FIG. 2, the controller 30 includes memory 40 that stores information such as air flow 42, RPM 44, total air flow 46, engine off time 48, coolant temperature 50, air temperature 52, EGR error 54, and EGR error dot 56. The air flow 42, RPM 44, coolant temperature 50, and air temperature 52 information is received from the respective sensors as previously discussed. The total air flow 46 information is calculated by the controller 30 and represents an accumulation of air that has passed into the intake manifold 14. The engine off time 48 is determined by a timer (not shown) within the controller 30 and represents the total amount of time that the engine system 10 has not been in operation. EGR error 54 is calculated by an error module 58 and represents the difference between a desired and measured pintle 24 position. EGR error dot 56 is also calculated by the error module 58 and represents the rate of change of the EGR error 54. The controller 30 also includes an EGR valve pintle positioning system 60 of the present invention that uses the previously discussed information from memory 40 to position the pintle 24 of the EGR valve 22.

A predicted temperature fuzzy logic module 62 receives the coolant temperature 50 and the air temperature 52 information and generates a predicted temperature modifier based thereon. The predicted temperature modifier is a representation of a predicted temperature of the pintle 24. The temperature of the pintle 24 helps predict the operating characteristics of the EGR valve 22 because the reaction of the pintle 24 is slower at high temperatures. In a preferred embodiment, the predicted temperature fuzzy logic module uses a two dimensional 5×5 rule matrix. The predicted temperature modifier is a point in the matrix where the coolant temperature 50 and the air temperature 52 intersect.

An under heat fuzzy logic module 64 receives the total air flow 46 and engine off time 48 information and generates an under heat modifier. The under heat modifier is a representation of the temperature of the pintle 24 and is used when the engine system 10 initially starts until it has warmed up to a normal operating temperature. In a preferred embodiment, the under heat fuzzy logic module 64 uses a two dimensional 5×5 rule matrix. The under heat modifier is a point in the rule matrix where the total air flow 46 and engine off time 48 intersect.

An over heat fuzzy logic module 66 receives the air flow 42 and RPM 44 information and generates an over heat modifier. The over heat modifier is a representation of the heat that is reaching the pintle 24 when the engine system 10 has warmed up to the normal operating temperature. In a preferred embodiment, the over heat fuzzy logic module 66 uses a two dimensional 5×5 rule matrix. The over heat modifier is a point in the rule matrix where the air flow 42 and RPM 44 intersect.

An error fuzzy logic module 67 receives the EGR error 54 and EGR error dot 56 information and generates a first position signal. In a preferred embodiment, the EGR error fuzzy logic module 67 uses a two dimensional 5×5 rule matrix. The first position signal is a point in the rule matrix where the EGR error 54 and EGR error dot 56 intersect.

A multiplication module 68 generates a modifier signal based on the product of the predicted temperature under heat, and over heat modifiers. A summation module 69 then adds the modifier signal and first position signal to generate a second position signal. The second position signal is a representation of position as modified by the modifiers that monitor operation of the engine system 10.

A limiting function module 70 receives the second position signal and creates a command signal to position the pintle 24 of the EGR valve 22. The limiting function scales the command signal to a value between an upper and a lower level that is capable of controlling the position of the pintle 24 in the EGR valve 22. In a preferred embodiment, the command signal represents a magnitude of current and a time period in which the magnitude of current is provided. However, any command signal used to control the position of the pintle 24 in the EGR valve 22 may be used in accordance with the present invention.

When the EGR valve pintle positioning system 60 positions the pintle valve 24, the position sensor 39 sends the measured position signal to the error module 58. The error module 58 determines EGR error 54 and EGR error dot 56. As previously discussed, EGR error 54 is the difference between the desired and measured position of the pintle 24 and EGR error dot 56 is the rate of change of EGR error 54.

Figure 3:
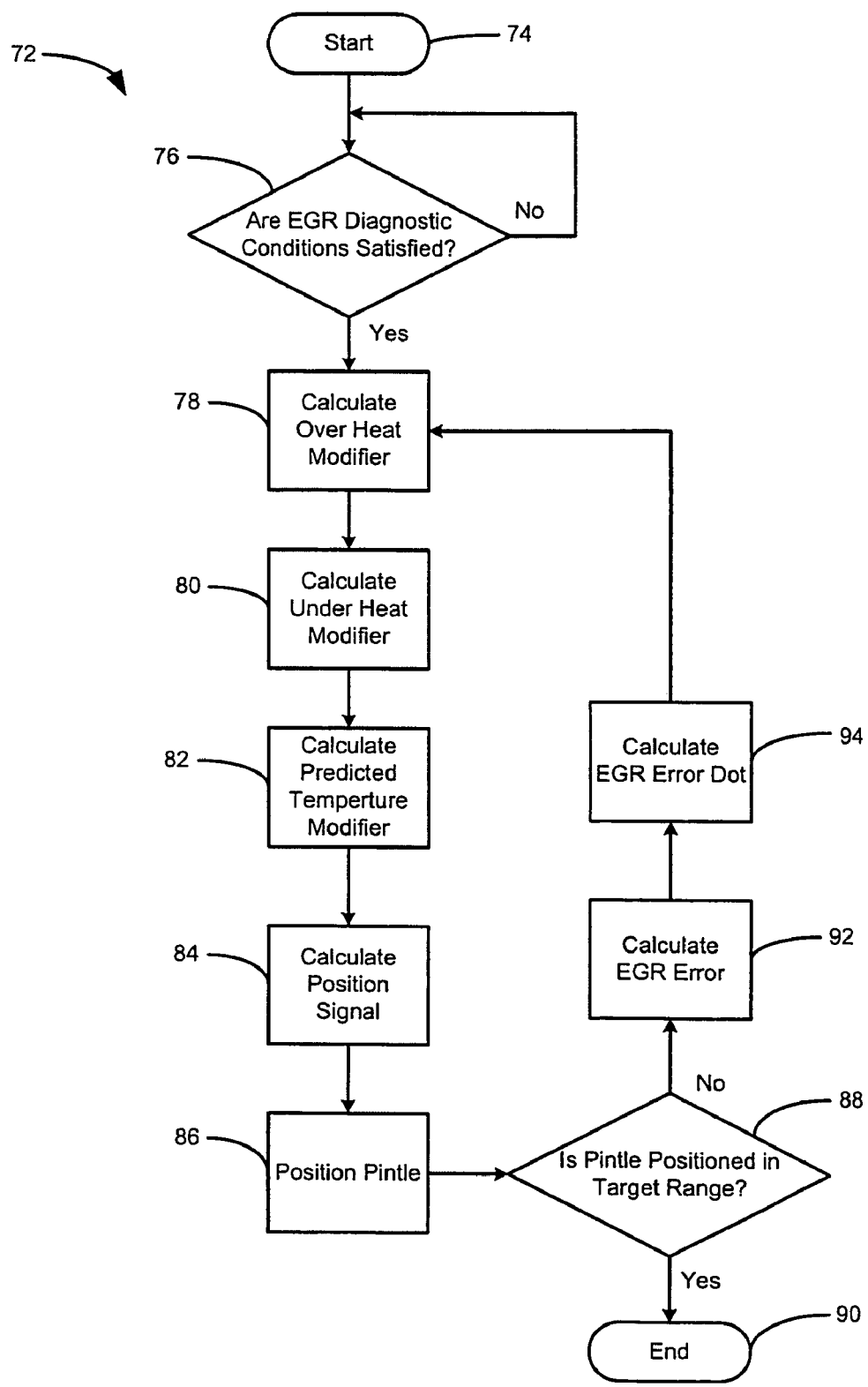
FIG. 3 is a flowchart illustrating exemplary steps executed by the fuzzy logic pintle positioning system according to the current invention.

Referring now to FIG. 3 the EGR valve pintle positioning system 60 implements a method generally identified at 72. The method 72 starts at step 74. In step 76, control determines whether EGR diagnostic conditions have been met. Exemplary conditions include, but are not limited to, vehicle deceleration, throttle closed and engine revolutions within a predetermined range. The process remains in step 76 until the EGR diagnostic conditions have been met.

Once the EGR diagnostic conditions have been met, the over heat modifier is calculated by the over heat fuzzy logic module 66 in step 78. In step 80, the under heat fuzzy logic module 64 calculates the under heat modifier. In step 82, the predicted temperature module 62 calculates the predicted temperature modifier. A control signal is calculated in step 84 to position the pintle 24 by adding the product of the over heat, under heat, and predicted temperature modifiers to the first position signal generated by the error fuzzy logic module 67 and then scaling the result with the limiting function module 70. In step 86, the control signal calculated in step 84 is used to position the pintle 24.

Once the pintle 24 has been positioned, the EGR valve pintle positioning system determines if the pintle 24 is in the desired position by comparing the measured position to the desired position in step 88. If the pintle 24 is in the desired position, the process ends in step 90. Otherwise, the error module 58 calculates the EGR error 54 in step 92 by comparing the measured position to the desired position. In step 94, the error module 58 calculates the EGR error dot 56 by determining the rate of change of the EGR error 54 and the process returns to step 78 for another cycle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An exhaust gas recirculation (EGR) valve positioning system for an engine system that positions a pintle within an EGR valve based on a temperature of the pintle, comprising:
   a predicted temperature fuzzy logic module that determines a predicted temperature of the pintle and generates a predicted temperature modifier based on said predicted temperature;
   an under heat fuzzy logic module that generates an under heat modifier representing the temperature of the pintle during warmup of the engine system;
   an over heat fuzzy logic module that generates an over heat modifier representing the temperature of the pintle after warmup of the engine system; and
   a multiplication module that communicates with said predicted temperature fuzzy logic module, said under heat fuzzy logic module, and said over heat fuzzy logic module and generates a modifier signal based on a product of said predicted temperature modifier, said under heat modifier, and said over heat modifier.

2. The EGR valve positioning system of claim 1 further comprising:
   an error fuzzy logic module that generates a first position signal based on a measured position of the pintle; and
   a summation module that communicates with said multiplication module and said error fuzzy logic module and generates a second position signal based on a summation of said modifier signal and said first position signal.

3. The EGR valve positioning system of claim 2 further comprising a limiting function module that communicates with said summation module and scales said second position signal between an upper and lower level creating a command signal to control the pintle.

4. The EGR valve positioning system of claim 3 further comprising:
   a pintle position sensor that generates said measured position of the pintle; and
   an error module that communicates with said pintle position sensor and calculates an EGR error and an EGR error dot based on said measured position of the pintle and a desired position of the pintle.

5. The EGR valve positioning system of claim 3 wherein said command signal comprises a magnitude of current and a period of time in which said magnitude of current is provided.

6. The EGR valve positioning system of claim 4 further comprising:
   a predicted temperature rule matrix within said predicted temperature fuzzy logic module wherein said predicted temperature rule matrix elements include coolant temperature and air temperature of the engine system;
   an under heat rule matrix within said under heat fuzzy logic module wherein said under heat rule matrix elements include total air flow and engine off time of the engine system;
   an over heat rule matrix within said over heat fuzzy logic module wherein said over heat rule matrix elements include air flow and engine revolutions of said engine system; and
   an error rule matrix located within said error fuzzy logic module wherein said error rule matrix elements include said EGR error and said EGR error dot.

7. The EGR valve positioning system of claim 6 wherein:
   said predicted temperature modifier is generated by determining where said coolant temperature and said air temperature intersect in said predicted temperature rule matrix;
   said under heat modifier is generated by determining where said total air flow and said engine off time intersect in said under heat rule matrix;
   said over heat modifier is generated by determining where said air flow and said engine revolutions intersect in said over heat rule matrix; and
   said position signal is generated by determining where said EGR error and said EGR error dot intersect in said error rule matrix.

8. The EGR valve positioning system of claim 7 wherein said EGR error is based on the difference between said desired position of the pintle and said measured position of the pintle, and wherein said EGR error dot represents how fast said EGR error is changing.

9. A method of positioning a pintle within an EGR valve for an engine system that predicts operating characteristics of the EGR valve based on a temperature of the pintle, comprising:
   determining a predicted temperature of the pintle and generating a predicted temperature modifier based on said predicted temperature;
   generating an under heat modifier representing the temperature of the pintle during warmup of the engine system;
   generating an over heat modifier representing the temperature of the pintle after warmup of the engine system; and
   generating a modifier signal based on a product of said predicted temperature modifier, said under heat modifier, and said over heat modifier.

10. The method of claim 9 further comprising:
    generating a first position signal based on a measured position of the pintle; and
    generating a second position signal based on a summation of said modifier signal and said first position signal.

11. The method of claim 10 further comprising generating a command signal to control the pintle by scaling said second position signal between an upper and a lower level.

12. The method of claim 11 wherein said command signal comprises a magnitude of current and a period of time in which said magnitude of current is provided.

13. The method of claim 11 further comprising calculating an EGR error and an EGR error dot based on said measured position of the pintle and a desired position of the pintle.

14. The method of claim 13 further comprising:
    providing a predicted temperature rule matrix wherein said predicted temperature matrix elements include coolant temperature and air temperature of the engine system;

providing an under heat rule matrix wherein said under heat rule matrix elements include total air flow and engine off time of said engine system;

providing an over heat rule matrix wherein said over heat rule matrix elements include air flow and engine revolutions of the engine system; and providing an error rule matrix wherein said error rule matrix elements include said EGR error and said EGR error dot.

15. The method of claim 14 wherein:

said predicted temperature modifier is generated by determining where said coolant temperature and said air temperature intersect in said predicted temperature rule matrix;

said under heat modifier is generated by determining where said total air flow and said engine off time intersect in said under heat rule matrix;

said over heat modifier is generated by determining where said air flow and said engine revolutions intersect in said over heat rule matrix; and said first position signal is generated by determining where said ERG error and said EGR error dot intersect in said error rule matrix.

16. The method of claim 15 wherein said EGR error is based on the difference between said desired position of the pintle and said measured position of the pintle, and wherein said EGR error dot represents how fast said EGR error is changing.

* * * * *